Patented July 25, 1933

1,919,730

UNITED STATES PATENT OFFICE

JOSEF KOENIG AND FRITZ STOEWENER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

POROUS METAL AND METAL OXIDE

No Drawing. Application filed June 10, 1930, Serial No. 460,288, and in Germany June 11, 1929.

The present invention relates to the production of porous metals and metal oxides.

Porous metals are usually prepared by melting out or dissolving out undesirable components from alloys. It is, however, difficult to obtain pure products in this manner and moreover the porosity of the metals thus obtained leaves much to be desired.

We have now found that porous metals or metal oxides having almost any desired degree of porosity may be prepared in a simple manner by working up finely divided metals, metal oxides or such metal compounds as are converted into oxides on heating, or mixtures of the same, into foams in the presence of liquids and foam producing agents, drying the foams, preferably by heating, and if required subjecting the masses obtained to a further treatment as for example by oxidation and/or reduction.

When it is desired to prepare porous metals, this is effected either by starting with metals which may be, if desired, in the colloidal state mixing or grinding these with solutions of foam producing agents and drying the foam carefully, the mass obtained being pressed or sintered by heating if desired or both these methods may be adopted, and moreover the mass may be subsequently oxidized and then reduced again to the metallic state; or the same result may be effected by starting with oxides or other reducible metal compounds, reducing the masses after drying the foam, and if desired sintering the mass, which may during sintering again be oxidized and afterwards again reduced. By this repeated oxidation and reduction the strength of the final product is improved.

When it is desired to prepare porous oxides this is effected in the same manner except that when starting with oxides reduction is omitted, or else reduction is always followed by an oxidation as the last operation.

As initial materials for the preparation of porous metals may be mentioned in particular pulverulent oxides of metals, which may be prepared in any suitable manner, as for example oxides of iron, chromium, manganese, nickel, cobalt, copper, zinc, molybdenum, lead and the like which are reducible to metals by heating with reducing substances as for example with gases and vapours such as hydrogen, ammonia, methane, carbon monoxide, illuminating gas, watergas, producer gas, formaldehyde, methyl formate and the like or with liquids such as hydroxylamine, hydrazine hydrate solutions and the like which are chosen depending on the nature of the oxides to be treated. Solid reducing agents such as for example finely divided carbon, magnesium, aluminium and the like, may be used alone or together with liquid or gaseous reducing agents by working the said solid reducing agents together with the metal oxide into a foam and making the foam ready as described. Oxides which are in a colloidal form, as for example gels of iron oxide and the like, have the further advantage that after reduction they not only have the coarse pores of the foam but also have ultramicroscopic pores, and when they are employed as carriers for catalytic substances or as catalysts are eminently suitable for carrying out catalytic reactions. Moreover, readily reducible oxides may also be worked up into foam together with other substances which are not reducible or only difficultly reducible under the working conditions as for example aluminium oxide, titanium oxide and the like, for example for the preparation of catalytic substances which are permeated either by metallic or by oxidic activators. Further, very finely powdered metals as for example iron, nickel, cobalt, and the like such as are obtained for example by the decomposition, preferably the thermal decomposition of the corresponding metal carbonyls, may serve as the initial materials, if desired in admixture with oxides of other metals or oxides of carbonyl forming metals or metal oxides obtained directly by the decomposition of metal carbonyls under oxidizing conditions. Metal compounds such as nitrates, carbonates, chlorides, ammonium compounds, as for example ammonium vanadate, metal cyanides, formates, acetates and the like may also be added, or may be employed as initial materials when they are thermally decomposable into the corresponding oxides, since after drying the foam it is easy to drive out carbon dioxide, nitrous oxides and the like by heating or to remove carbon-like constituents by igniting in an oxidizing atmosphere, the oxidic foams being then reduced, if desired, when such oxidation has been applied.

Water may usually be employed as the suspending agent for the said metals or metal compounds, but other liquids may be employed or partially employed for this purpose, especially organic media, as for example ethyl alcohol, when a rapid drying of the foam is to be effected or when water is to be partially or wholly avoided in the preparation of a catalytic substance.

It is preferable to proceed by suspending the metals or oxides to be employed, or a mixture of several oxides or metals or alloys or mixtures of metals and oxides or other metal compounds, which mixtures or alloys may be obtained by fusion, in a finely powdered form in the liquid and by then adding the necessary quantity of foam producing agent while stirring continuously. Sulphonic acids of aromatic hydrocarbons which have been alkylated in the nucleus, or products containing the same, or salts of the said acids have been found to be especially suitable as foam producing agents, and even a small quantity, as for example 1 per cent by weight of the metal oxide, is sufficient to produce stable and homogeneous foams. Any other suitable foam producing agents, such as saponin, soaps, sulphuric esters of organic compounds, or salts thereof, and the like agents may, however, also be employed. By varying the quantity and kind of the suspension liquids as well as by smaller or larger additions of foam producing agents it is possible to obtain foams having very different strength and size of pores. The size of the pores and their number may also be modified by blowing air or other gases or vapours into the mixture. In some cases it is also advantageous to add binding agents as for example solutions of silicic acid, plasticizable clay, cement, and the like, which by subsequent heating improve the mechanical strength of the porous masses or to incorporate the foam, or the components before its production, with a hydraulic binding agent. Water glass, readily fusible metals and alloys such as for example sodium, calcium, lead, tin and Wood's metal, or substances, such as acids or alkalies furnishing binding agents by reaction, moreover organic substances such as glue, sugar, starch, albumin, bitumen, resin and the like may also be added. Moreover, non-metals may be added, for example graphite, coke, boron, sulphur and tellurium, or metal compounds which are not decomposable by heat into the corresponding metal oxides, may be added. Compounds of the latter kind comprise for example carbides, cyanides, silicides, nitrides, phosphates, borates, complex salts and the like. Instead of the said binding agents, non-binding but fusible or sintering substances such as powdered glass may be added. The strength may also be increased by metallic reinforcing structure such as metal frames, which may be filled with metal wool or metallic fabrics, or by introducing the foam into pressed particles of metal wool.

The foam, when prepared, is spread or poured into suitable moulds, as for example into shallow plates or tubular moulds, and is dried at elevated temperatures depending on the nature of the material under treatment. This may be followed when volatile or combustible components are to be removed, by a heating, if desired in a current of oxygen. In addition to the preparation of the catalytic substances or carrier masses, the process according to the present invention is also suitable for the production of porous bearing metals, plates for accumulators, filter bodies, for example for removing dust from gases or solid particles from emulsions such as mixtures of coal or charcoal and oils as occur in the destructive hydrogenation of coal, brown coal or tars and oils and in refining vegetable and animal oils or fats, for the production of fillers and the like as for example for metallic building stones or bricks, and also for the preparation of diaphragms, moulds or safety devices preventing the flames of burners or blast burners from striking back. Since by appropriate preparation the masses obtained are tenacious, and plastic when under pressure, and are therefore capable of being moulded, masses which are suitable as fillings or stoppings for teeth may be prepared by starting with noble metals or compounds of the same.

When preparing catalytic substances it may be advantageous in some cases to subject the foams of metals or metal oxides to a further chemical treatment. Thus for example for the preparation of catalytic substances for cracking mineral oils and the like, or for destructive hydrogenation and the like, dry foams of aluminium metal may be activated by etching the surface with acids or halogens, as for example chlorine, hydrogen chloride, alcoholic hydrochloric acid or other substances as for example uranyl nitrate, and in this case the foams may be produced from aluminium powder and a readily reducible oxide or carbonate of a metal as for example of copper and the like, and after reduction of the same they are activated. The metals or metal oxides may also wholly be converted into other compounds, for instance into chlorides, sulphates, sulphides, nitrides, carbides and the like.

The masses obtained may be easily mechanically worked, for example by sawing, hammering, filing, stamping and the like. Moreover, plates of the same or different metals or metal oxides may be joined to one another even by slight pressure.

For the production of metallic masses with particular properties such as cores for electromagnets the pores of the metallic spongy masses may be filled with insulating substances such as shellac, India or a similar natural rubber, polymerization products of diolefines or the like materials, preferably in the liquid or dissolved or suspended state, the masses being then solidified by pressure, if desired. On the other hand, powdery materials such as silica gel, active carbon, bleaching earth or base exchangers or pulverulent catalytic agents or suspensions thereof may be incorporated with the spongy masses, for example by shaking or while grinding or by sucking or blowing, the masses being then pressed, if desired. Similarly, powders may be spread between two or more spongy plates, which are then joined by pressure.

The catalytic substances may also be precipitated within the pores in the usual manner by impregnating the porous bodies with solutions of compounds of the catalytic substances which contain a volatilizable component, such as for example the nitrates, acetates, ammonium compounds, certain chlorides and complex salts, which afterwards are converted into the catalytic substances by a thermal treatment, if desired, after converting the said substances with other reagents, and washing, or by reduction. The walls of the pores, for example of the porous metals, may also be provided with a metallic layer of the same or another metal or with a layer of several metals or mixtures of metals by electrolytically precipitating the metals or by precipitating colloidal metals by means of electrical dispersion, or by spraying the finely divided metals into the pores, or by passing vapours of the metals through the porous masses or dipping the latter into a melt of the said metals. Likewise non-metals, for example carbon, soot, sulphur and the like which often show a high catalytic efficiency may be deposited within the pores for example by carbonizing solid, liquid or gaseous carbonaceous materials within the pores, by partially burning such materials, or by thermal decomposition at high temperatures. Carbon with metallic lustre may for instance be precipitated on porous copper or porous iron which has previously been coated with a layer of magnesia or alumina, which may be produced by impregnating the porous metal with a sol of magnesia or alumina, and drying. The catalytic porous masses thus obtained may for instance be employed in the production of acetic acid from solutions of acetaldehyde.

The following examples will further illustrate the nature of this invention but the invention is not restricted to these examples. The parts are by weight.

*Example 1*

A stiff foam is produced from 120 parts of finely powdered copper oxide, or a mixture of 60 parts of copper and 60 parts of copper oxide, 100 parts of water and 2 parts of sodium di-isopropyl naphthalene sulphonate by vigorous stirring or churning and the foam is formed into sticks and carefully dried at 100° C. The dry foam is then gradually heated to from 900° to 1000° C. in an atmosphere of hydrogen. In this manner a partially sintered, very porous stick of metallic copper is obtained the pore volume of which may be subsequently reduced by compression to any desired extent while simultaneously increasing its strength.

*Example 2*

100 parts of hammer scale ($Fe_3O_4$) are worked up into a foam with 25 parts of water and 2 parts of saponin while stirring vigorously and the foam is then treated in the manner described in Example 1. The reduction is effected with hydrogen at 1150° C. The product obtained is a tough, resistant sponge like, porous body which may be employed for example as a catalytic substance or as a carrier for catalytically active substances and can be further strengthened by sintering at a temperature above 1150° C. A highly porous metal oxide may be obtained by subsequent oxidation.

*Example 3*

570 parts of a silver oxide which has been recently precipitated, washed and filtered by strong suction are worked up into a foam with 4 parts of sodium di-butyl naphthalene sulphonate while stirring vigorously. The foam is then introduced into moulds and after careful drying is gradually heated to 400° C. whereby it is converted into porous metallic silver. The conversion may be obtained in some cases already by initiating decomposition by igniting the porous mass or by percussion. The porous silver is highly active and suitable for decomposing ozone of hydrogen peroxide and degerminating water.

*Example 4*

For the production of accumulator plates 100 parts of lead oxide are mixed with 5 parts of sodium mono-butyl naphthalene sulphonate and 10 parts of 33 per cent aqueous glycol which may contain also some glycerol ethylene and stirred into a foam, which is then shaped into plates or pressed into crates or pockets of lead plates the plates being then slowly dried in the air or by warming, if desired, in vacuo. The foam may be prepared from lead, red lead, lead peroxide or litharge or a mixture of lead and a lead oxide.

Example 5

200 parts of iron oxide are mixed with 15 parts of the sodium salt of a sulphonic acid prepared from a mineral tar oil containing alkylated cyclic hydrocarbons, 400 parts of iron powder and 200 parts of water, while working the mass into foam. The mass is then fed into iron pipes the walls of which have fine holes, and carefully dried by heating up to 400° C. The cylindric masses obtained are then removed from the moulds, treated with hydrogen while heating gradually to 1100° C. and then cut into discs suitable for use as filters.

Example 6

300 parts of freshly precipitated and dried silver oxide are mixed with 2 parts of the sodium salt of isopropyl-naphthalene sulphonic acid and 2 parts of saponin, treated with 80 parts of water containing 1 part of glue, and the whole is worked up into a foam. In order to produce a plate or rod the foam is poured into a suitable mould of gypsum, clay, porcelain and the like, dried and the porous silver oxide converted into the metal by slowly heating to 400° C. Thus a body of silver having a porosity of about 80 per cent is obtained which may be worked by pressing and the like in any desired form.

Example 7

50 parts of nickel oxide powder are well mixed with 300 parts of nickel powder and 7 parts of saponin, the mixture being then worked into a foam with 100 parts of water in which 6 parts of glue are dissolved. The foam is filled into moulds of porous iron and dried therein. The dry plates are heated in hydrogen to 1100° C. A solid body of iron of a porosity of about 80 per cent is thus obtained.

Example 8

A mixture of powdery molybdenum and chromium to which compounds of the said metals may be added, is worked up into a foam with water and a foaming agent, a binding agent, such as for example water glass, caolin and the like, being added, if desired. The foam being then worked up to a porous body in the manner described above. The porous body thus obtained is suitable as catalyst in the destructive hydrogenation of coal, tars, mineral oils and the like.

Example 9

A mixture of 97 parts of iron powder, 2 parts of aluminium powder and 1 part of potassium nitrate is made into a foam with 2 parts of saponin and 20 parts of water, the porous body being then formed, dried and heated to about between 1000° and 1200° C. in a reducing gas, for example hydrogen. A mixture of iron powder, aluminium powder and potassium nitrate may also be first produced, the mixture being then melted in an oxygen atmosphere, and then 70 parts of the cooled melted product which has been pulverized, are made into a foam with 30 parts of iron powder, saponin and water in the manner above described. The pulverized melted product may also be first made into foam with saponin and water and the foam solidified by heating at high temperatures in an atmosphere of non-reducing gases, for example air, whereupon the mass is reduced under mild conditions, preferably under such conditions under which the mass is later on to be used as catalyst. If the mass is intended to be used as catalyst in the synthesis of ammonia a nitrogen hydrogen mixture may be used as reducing gas. Due to the high porosity of the masses thus obtained they offer only slight resistance to gases led through, and they may therefore be used as a uniform porous mass filling the entire cross-section of the catalytic reaction chamber.

Example 10

100 parts of aluminium powder are made into a foam with 1 part of saponin and 100 parts of alcohol containing a little hydrochloric acid. The foam is then poured into moulds, dried and heated in a reducing gas to solidify the foam by sintering. By the slight etching action of the hydrochloric acid oxidation of the metal is hindered or a layer of oxide which may already be present replaced by a layer of chloride so that on subliming the latter off, fritting of the small metal parts can take place.

In a similar manner other readily oxidizable metals, such as for example magnesium, calcium and the like may be worked up into metallic foams which by subsequent treatment may be superficially or wholly oxidized. Zirconium or zirconium oxide may be worked up into foams in a similar manner.

Example 11

50 parts of silicon and 55 parts of glass powder are well mixed with about 2 parts of the sodium salt of isopropylene naphthalene sulphonic acid and made into a foam with 50 parts of water. The foam is poured into moulds and dried. The dry foam is strengthened by heating it at 1200° C. in a reducing atmosphere, a hard, highly porous body being thus obtained.

What we claim is:—

1. A process of producing porous metals and metal oxides, which comprises making a mixture of at least one ingredient selected from the group consisting of metals, metal oxides and such metal compounds as are converted into metal oxides on heating, with a liquid and a foam producing agent into a foam and drying the latter.

2. A process of producing porous metals and metal oxides, which comprises making a mixture of at least one ingredient selected from the group consisting of metals, metal oxides and such metal compounds as are converted into metal oxides on heating, with a liquid and an alkylated naphthalene sulphonic acid into a foam and drying the latter.

3. A process of producing porous metals and metal oxides, which comprises making a mixture of at least one ingredient selected from the group consisting of metals, metal oxides and such metal compounds as are converted into metal oxides on heating, with a liquid and a foam producing agent into a foam, drying the latter and heating the dry porous product obtained to sintering temperature.

4. A process of producing porous metals and metal oxides, which comprises making a mixture of at least one ingredient selected from the group consisting of metals, metal oxides and such metal compounds as are converted into metal oxides on heating, with a liquid and an alkylated naphthalene sulphonic acid into a foam, drying the latter and heating the dry porous product obtained to sintering temperature.

5. A process of producing porous metals, which comprises making a mixture of a metal oxide with a liquid and a foam producing agent into a foam, drying the latter and reducing the porous oxide obtained to the corresponding metal.

6. A process of producing porous metals, which comprises making a mixture of a metal and a metal oxide with a liquid and a foam producing agent into a foam, drying the latter and reducing the metal oxide present in the porous body obtained to the corresponding metal.

7. A process of producing porous metals, which comprises making a mixture of a metal oxide with a liquid and a foam producing agent into a foam, drying the latter and reducing the porous oxide obtained to the corresponding metal while heating to sintering temperature.

8. A process of producing porous metals, which comprises making a mixture of a metal and a metal oxide with a liquid and a foam producing agent into a foam, drying the latter and reducing the metal oxide present in the porous body obtained to the corresponding metal, while heating to sintering temperature.

JOSEF KOENIG.
FRITZ STOEWENER.